United States Patent [19]

Gorenflo et al.

[11] Patent Number: 5,699,448

[45] Date of Patent: Dec. 16, 1997

[54] SPLIT FIELD OPTICS FOR LOCATING MULTIPLE COMPONENTS

[75] Inventors: Michael J. Gorenflo, Castle Creek; Peter M. Lister, Johnson City, both of N.Y.

[73] Assignee: Universal Instruments Corporation, Binghamton, N.Y.

[21] Appl. No.: 498,128

[22] Filed: Jul. 5, 1995

[51] Int. Cl.⁶ .................................................. G06K 9/00
[52] U.S. Cl. .......................... 382/151; 382/100; 382/152
[58] Field of Search ................................. 382/100, 103, 382/106, 141, 143, 144, 145, 147, 148, 149, 150, 151, 152, 153; 355/1; 356/73.1; 29/834

[56] References Cited

U.S. PATENT DOCUMENTS

| | | | |
|---|---|---|---|
| 3,068,772 | 12/1962 | MacNeille | 95/44 |
| 3,136,208 | 6/1964 | Magson | 88/16.6 |
| 4,441,817 | 4/1984 | Pryor | 356/375 |
| 4,599,908 | 7/1986 | Sheridan et al. | 73/862.04 |
| 4,608,494 | 8/1986 | Kobayashi et al. | 250/461.1 |
| 4,628,464 | 12/1986 | McConnell | 364/513 |
| 4,677,473 | 6/1987 | Okamoto et al. | 382/150 |
| 4,776,088 | 10/1988 | Biggs et al. | 29/834 |
| 4,791,715 | 12/1988 | Lovelace | 29/464 |
| 4,805,123 | 2/1989 | Specht et al. | 382/151 |
| 4,896,418 | 1/1990 | Yearsley | 29/827 |
| 4,951,383 | 8/1990 | Amao et al. | 29/721 |
| 4,987,602 | 1/1991 | Brunner et al. | 382/100 |
| 5,172,421 | 12/1992 | Nakamura et al. | 382/141 |
| 5,172,468 | 12/1992 | Tanaka et al. | 29/721 |
| 5,194,948 | 3/1993 | L'Esperance, III et al. | 358/106 |
| 5,225,026 | 7/1993 | Ozawa et al. | 156/378 |
| 5,379,514 | 1/1995 | Okuda et al. | 29/833 |
| 5,454,049 | 9/1995 | Oki et al. | 382/141 |

*Primary Examiner*—Leo Boudreau
*Assistant Examiner*—Bipin Shalwala
*Attorney, Agent, or Firm*—Banner & Witcoff, Ltd.

[57] ABSTRACT

An apparatus and method is provided for capturing component location information through the use of fiber optic conduits. In various embodiments, an image of a component attached to a translatable and rotatable spindle is captured and transmitted along a fiber optic conduit to a camera coupled to an image processing computer. The image processing computer determines component location on the spindle based on the transmitted image and, where necessary, generates component location correction information so that the spindle and attached component can be moved to a determined location. A plurality of fiber optic conduits may be bundled together to provide a single combined image of multiple components attached to multiple spindles which can be captured by a single camera, wherein the image processing computer segregates the images and determines multiple component location correction information.

19 Claims, 7 Drawing Sheets

4:3 aspect

4:3 aspect

SPLIT FIELD OPTICS FOR LOCATING MULTIPLE COMPONENTS

BACKGROUND OF THE INVENTION

1. Technical Field

This invention relates to an improvement for a component assembly device which attracts and mounts individual electronic components. In particular, the invention provides a novel means of capturing component location information using a minimum amount of time.

2. Related Information

As shown in FIG. 1, a conventional component assembly positioning device 100 comprises a support structure 101, a translational movement mechanism 102 for the X direction, and a translational movement mechanism 103 for the Y direction. A multi-spindle component placement head 200 is attached to mechanisms 102 and 103 to allow it to be movably placed over a desired area within the X-Y space of the positioning device. As is conventional, a printed circuit board or the like can be positioned under placement head 200, and the X and Y movement mechanisms carry placement head 200 to a desired location over the circuit board in order to place a component thereon. An upwardly looking camera 104 is used to capture an image of a component prior to placement. One example of an available machine which includes such a system is the General Surface Mount Application Machine model GSM1 available from Universal Instruments, Inc., of Binghamton, N.Y.

FIG. 2 shows in more detail component placement head 200 included in the positioning system of FIG. 1. This head includes four spindles 201 through 204 to attach and place individual components on a circuit board. Each spindle can be driven individually or simultaneously in any combination to pick up components prior to placement on a component board. Various other elements such as device feeders and the like (not shown) may also be included in the component placement device of FIG. 1. Each spindle 201-204 preferably holds a single component for placement onto a circuit board in accordance with well known methods such as by vacuum attachment. Upwardly looking camera 104 is used to capture an image of a component prior to placement.

Each spindle may be independently rotated under computer control to cause a component to be oriented in a particular direction with respect to a circuit board. Additionally, placement head 200 may be laterally translated in the X and Y directions such that any component attached to a spindle may be positioned at a desired location.

A conventional optical system including camera 104 may be used to determine the location of each component on each spindle to account for discrepancies in translation and rotation of each component from a desired location. For example, a component picked up from an input by spindle 201 may be slightly offset from a desired location on the spindle, so that when spindle 201 is moved downwardly to install the component at a desired location on a circuit board, it is installed in an erroneously offset position.

The optical system can detect the improper location of the component while it is on spindle 201, and a computer can then determine the proper adjustments to translation and rotation of spindle 201 prior to installing the component on the board. Likewise, the optical system detects the proper adjustments needed for the other three spindles. Conventionally, a single camera is used to sequentially capture images from each of the four spindles. However, in order to ensure a minimum component placement time, the optical system should ideally be able to simultaneously capture images from multiple spindles while the spindles are in translation from the component input section to the first component location on the board.

Unfortunately, simultaneously collecting component location information from a plurality of spindles would require multiple cameras, each camera used for capturing an image from a different spindle. This would result in additional expense and system complexity. For example, in order to simultaneously capture component placement information from the four spindles illustrated in FIG. 2, four separate cameras would be required, adding greatly to the cost, weight and complexity of the component placement device. Accordingly, it would be desirable to provide a system and method of collecting image location information from a plurality of components without requiring separate cameras and equipment. Additionally, it would be desirable to allow the camera to be located at some distance from the spindles rather than requiring it to be in close proximity to the spindles.

SUMMARY OF THE INVENTION

It is one object of the present invention to provide an improved method for determining and correcting component alignment by using a single camera which receives a split image of multiple components attached to a plurality of spindles on a multi-spindle head.

It is yet another object of the present invention to capture component placement information through the use of fiber optic conduits in order to allow for more convenient camera placement.

In various embodiments, a plurality of fiber optic conduits is arranged to receive a plurality of optical images from a plurality of components. The plurality of images from the fiber optic conduits is combined into a single image which is captured by a camera. An image processing computer segregates images from the combined image and determines translation and rotation correction amounts for each component based on the segregated individual image and the desired location for each component.

Various other objects and advantages of the present invention will become apparent through the following detailed description, figures, and the appended claims.

DETAILED DESCRIPTION OF THE PREFERRED EMBODIMENTS

Figure 1:
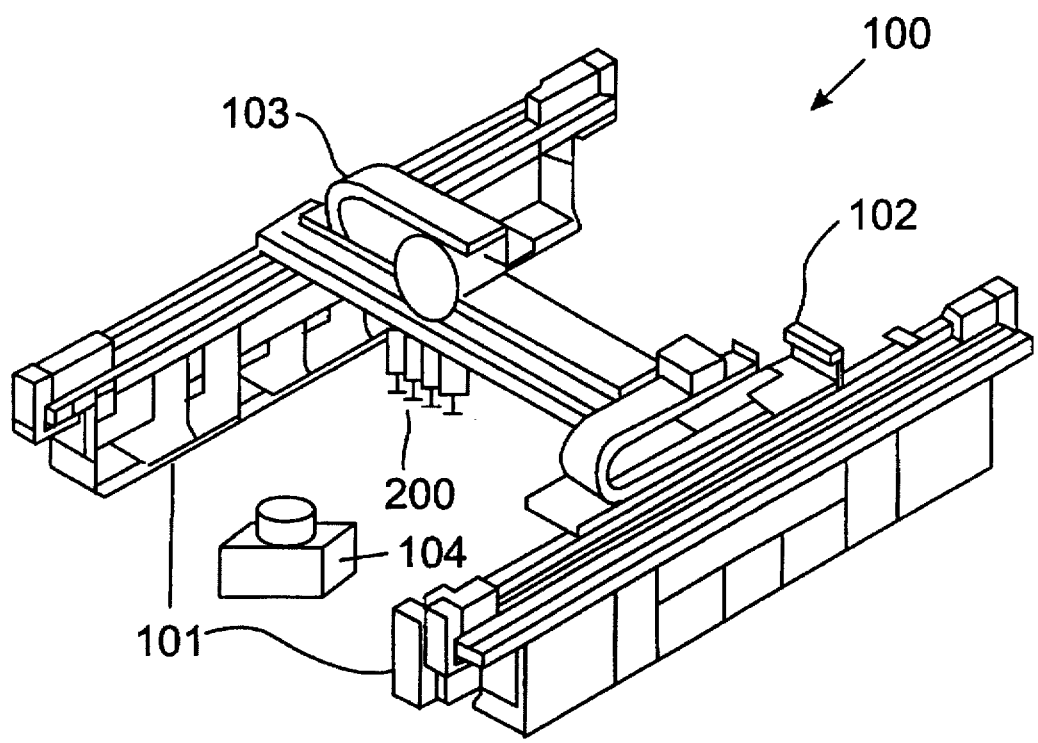
FIG. 1 shows a conventional component positioning system which incorporates a multi-spindle component placement head and an upwardly looking camera.
Figure 2:
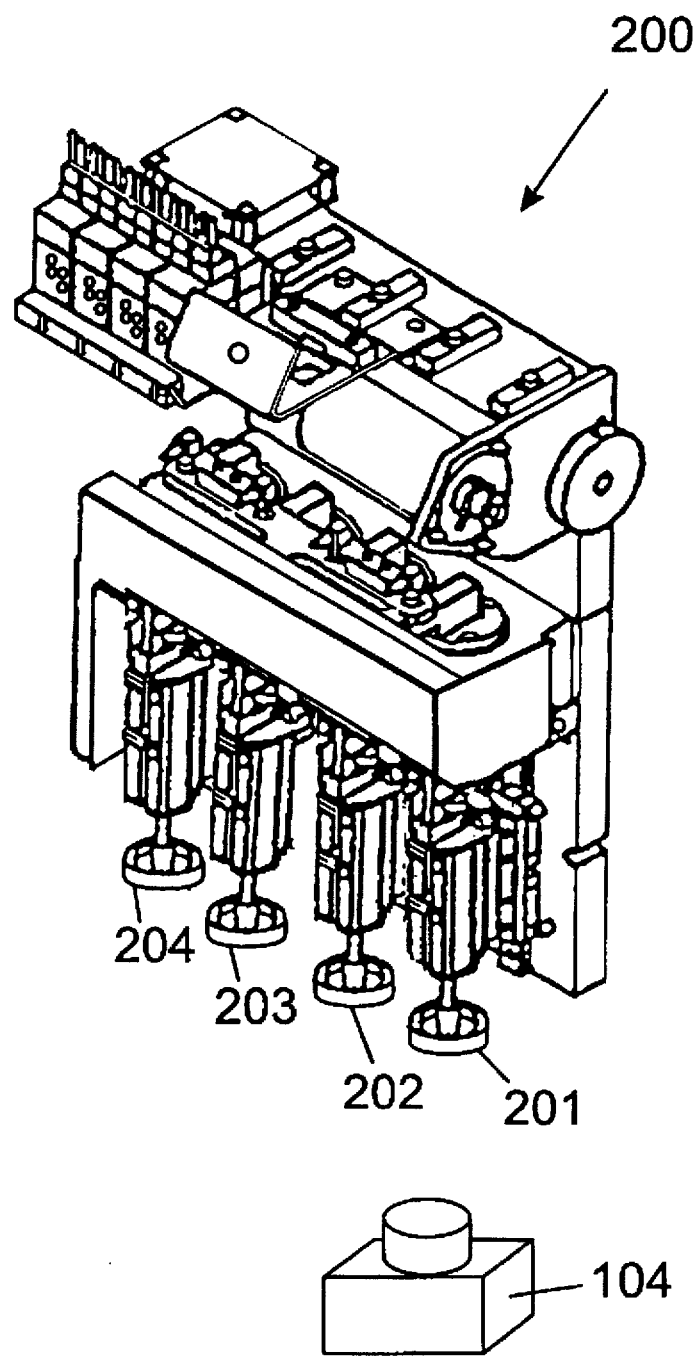
FIG. 2 shows in more detail a conventional multi-spindle component placement head and an upwardly looking earners which may be included in the system of FIG. 1.
Figure 3A:
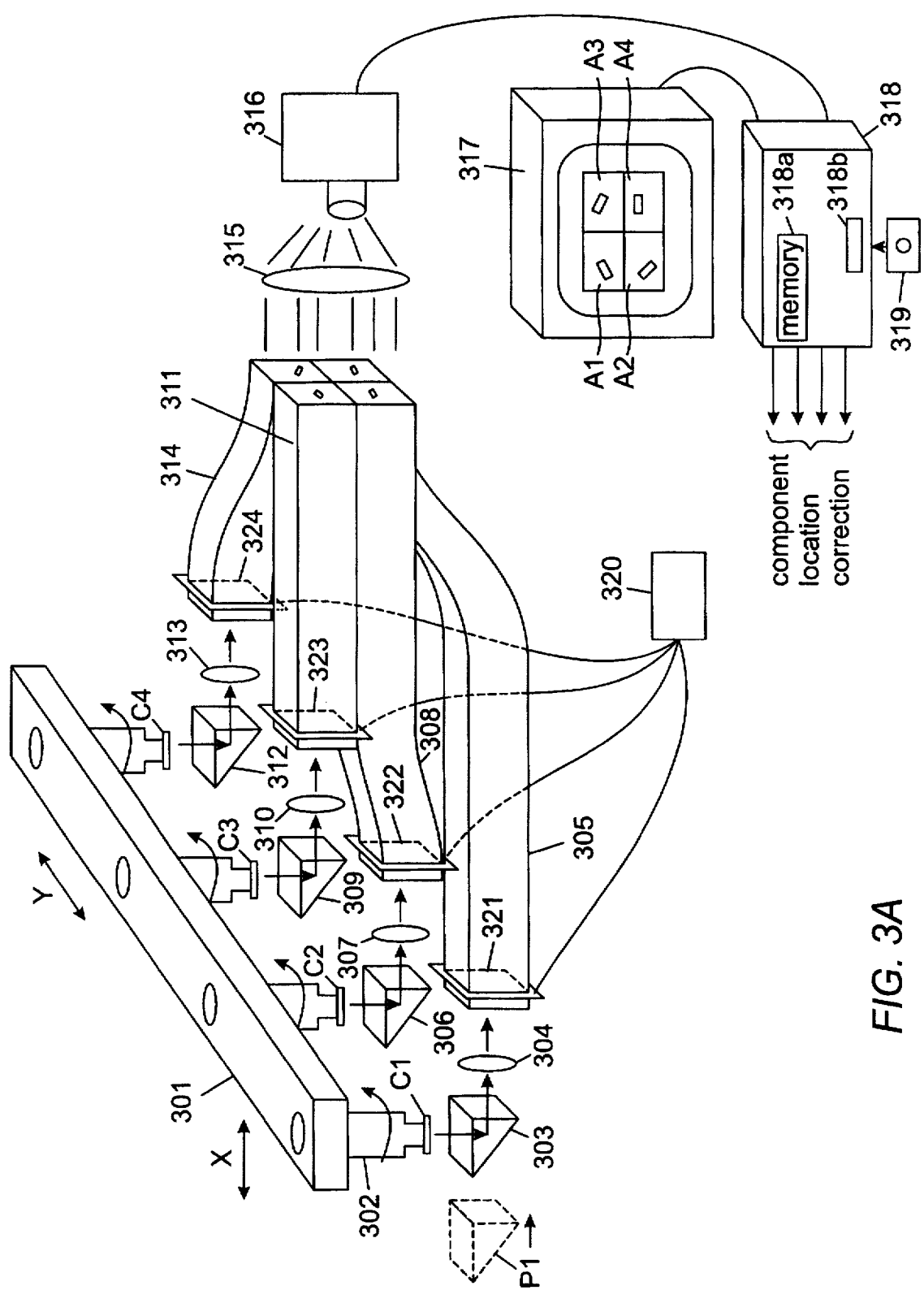
FIG. 3A shows one embodiment of a system employing various principles of the invention.

Various principles of the invention are illustrated in FIG. 3A. As shown in FIG. 3A, one embodiment of the invention includes a multi-spindle pick and place head 301 having a plurality of spindles 302 each for removably attracting a component C1 through C4 from an input storage area. As described above, the spindles are translated in both X and Y directions and may be rotated in order to position each component properly over a desired board location for installation. In accordance with various invention principles, after each component has been attached to a spindle, movable prisms 303, 306, 309 and 312 are moved from a first position exemplified by P1 to a second position underneath a corresponding spindle. (It may also be possible to use a single rectangular prism instead of individual prisms to accomplish the same result).

Light reflected from components C1 through C4 causes an image of each component to be transmitted through corresponding prisms 303, 306, 309 and 312 and corresponding lenses 304, 307, 309 and 313 to corresponding fiber optic conduits 305, 308, 311 and 314. Each fiber optic conduit transmits a component image to a single camera 316 which is coupled to an image processing computer 318 and optional display 317. Referring to prism 303, for example, the reflected light from component C1 is directed to a lens 304 and to a fiber optic conduit 305 which directs the image to a second lens 315 and thereafter to camera 316.

In accordance with various invention principles, a plurality of fiber optic conduits may be bundled together into a group as shown in FIG. 3A, so that a plurality of component images are simultaneously transmitted and appear as a single image. By abutting the ends of the fiber optic conduits together as shown in FIG. 3A, multiple images may be effectively combined into a single image for capture by camera 316. The arrangement shown in FIG. 3A may omit lenses such as 315 without departing from the scope of the invention.

Various methods of illuminating the components are possible. In one embodiment, a light source 320 is coupled to a plurality of flexible fiber optic bundles each of which is expanded out into an encasing frame 321, 322, 323 and 324 which surrounds a corresponding fiber conduit. Each encasing frame thus comprises a plurality of fibers which projects light towards a lens and prism to illuminate a component corresponding to one fiber optic conduit.

Rather than continuously monitoring the multiple component image information, a strobe light in place of light source 320 may be used to instantaneously capture a combined image. A strobe pulse of approximately 48 microseconds may be used, for example. Separate and sequentially synchronized strobes may be provided for each component image. A frame grabber in image processing computer 318 can be used to capture each component image under control of the computer.

Instead of using movable prisms 303, 306, 309, and 312, it may be possible to use stationary prisms, such that pick and place head 301 is moved temporarily over the stationary prisms in order to capture component location information during translation.

In FIG. 3A, camera 316 may comprise a CCD camera which transmits a digitized image from the combined fiber optic conduits and provides the combined image to an image processing computer 318 which stores the image in a memory. A display 317 may optionally be provided for visual confirmation of the component arrangements. Display 317 includes four separate areas A1 through A4 on one computer screen, each area corresponding to the image received from a particular component.

Image processing computer 318 receives the composite image containing components from all four spindles from the single camera and, by determining the translation and rotation discrepancies for each component location within each image area, issues appropriate control commands to adjust each component (translation and/or rotation) prior to placement of the components on a board at a desired location.

Because the camera image includes images from four separate components, image processing computer 318 must segregate each component image from the composite image and establish a coordinate system for each component image prior to determining the appropriate correction for each component. The segregation of separate images from a single image is well within the skill of one in the art and need not be described here. The image processing computer and software may comprise a vision system supplied by Applied Intelligence Systems of Ann Arbor, Mich. Such known software can extract component location information based on pixel locations in the image. Also see description of FIG. 5 below.

Image processing computer 318 may comprise a memory 318a for storing software and images from camera 316. A peripheral device 318b such as a floppy disk drive may be used for loading the software from a floppy disk 319 or other media.

Figure 3B:
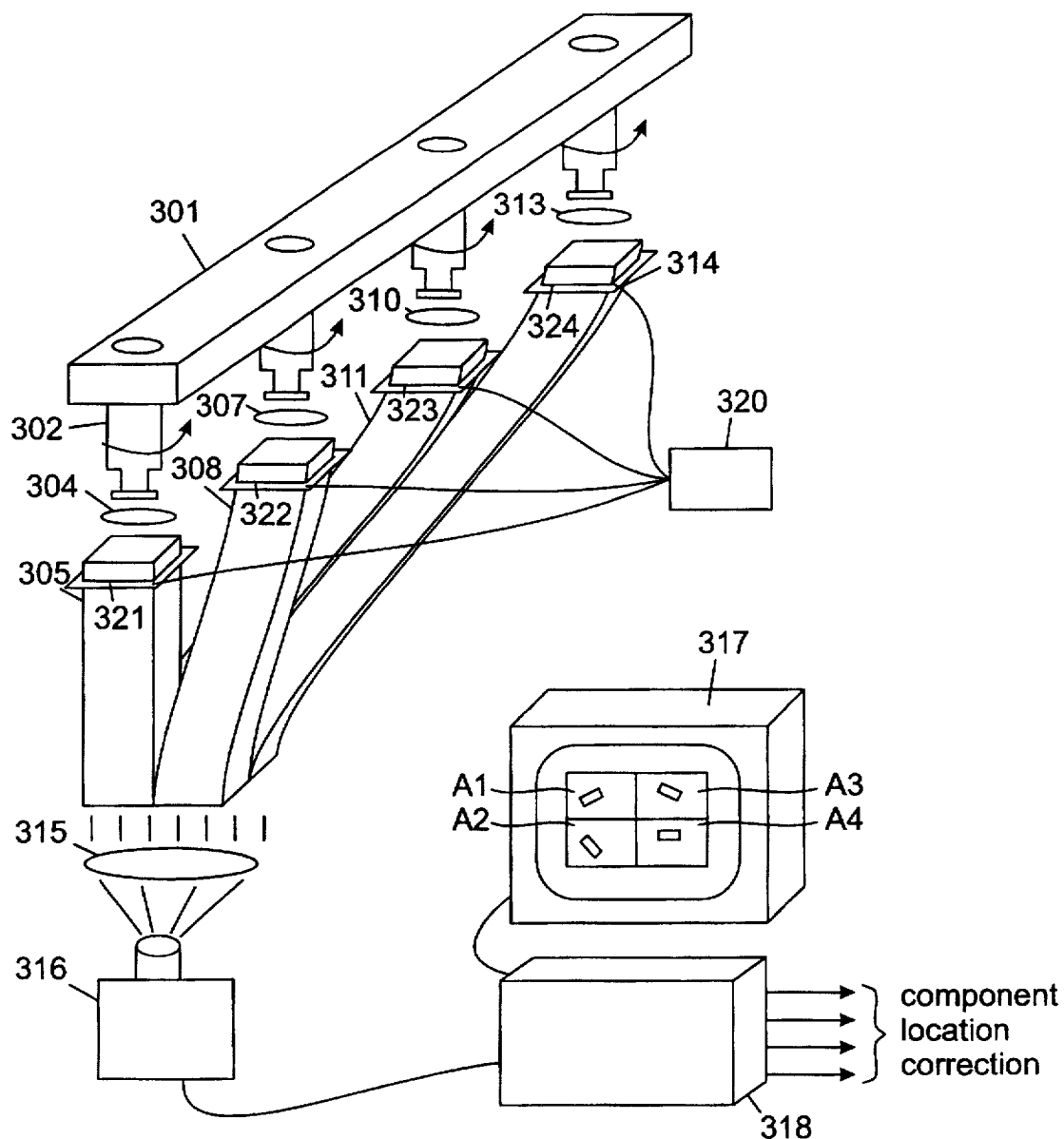
FIG. 3B shows a second embodiment of a system employing various principles of the invention.

FIG. 3B illustrates various other embodiments in which pick and place head 301 with attached components may be moved over stationary fiber optic conduits 305, 308, 311 and 314 without the need for prisms. Camera 316 captures a combined image from the separate optical fiber conduits in the same manner as that shown in FIG. 3A. The other components shown in FIG. 3B operate in essentially the same manner as those in FIG. 3A.

Figure 4A:
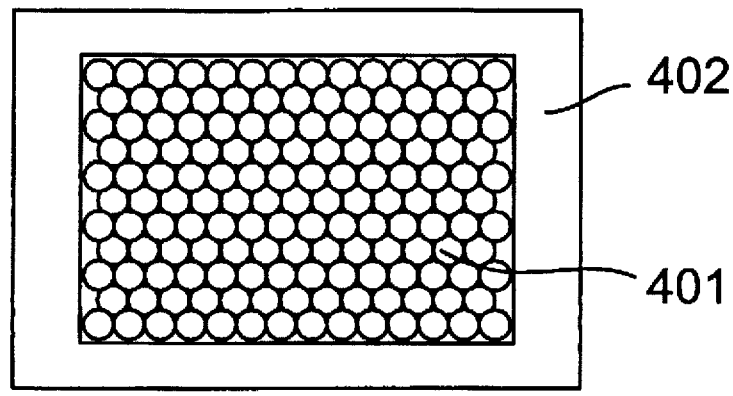
FIG. 4A shows a cross section of a fiber optic conduit with an outer illumination casing which may be used in various embodiments of the invention.
Figure 4B:
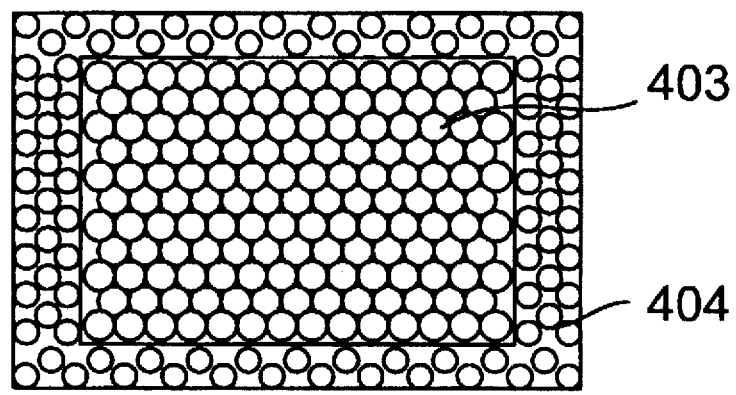
FIG. 4B shows a cross section of a fiber optic conduit with an inner portion of the fibers used for illumination.

FIG. 4A and FIG. 4B show one possible type of fiber optic conduit which may be used. In various embodiments, the fiber optic conduit may be constructed of a rectangular bundle of fibers with a cross sectional aspect ratio of approximately 4:3. Four such conduits, when bundled together as shown in FIG. 3A, generates a convenient image for capture by any of various standard digital cameras, and for processing a combined image in image processing computer 318. Any of various commercially available conduits may be used, such as ones presently available from Schott Fiber Optics of Southbridge, Mass.

In FIG. 4A, a rectangular bundle of fibers includes a core portion 401 which transmits a component image, and a light source 402 encased around the fiber optic bundle for illuminating the component. Light source 402 may comprise any of various types, such as light source 320 or a plurality of LEDs or incandescent lights. It may also be possible to use cylindrical instead of rectangular conduits. It has also been determined that glass fibers generally provide better transmission properties than plastic and it is desirable to minimize the number of bends and corners in the conduits since transmission degradation generally occurs. Prisms may be used to effect corner turns necessary.

FIG. 4B shows how a portion of the fiber optic bundle itself may be used to transmit light from a light source (not shown) to illuminate each component. An inner portion of fibers 403 is segregated from an outer potion of fibers 404, such that the inner portion is used to receive the reflected image, while the outer portion is used to transmit light from a light source and direct it at the component. Any of various light sources, such as light source 320 or a ring of LEDs or incandescent lights, may be used.

Figure 5:
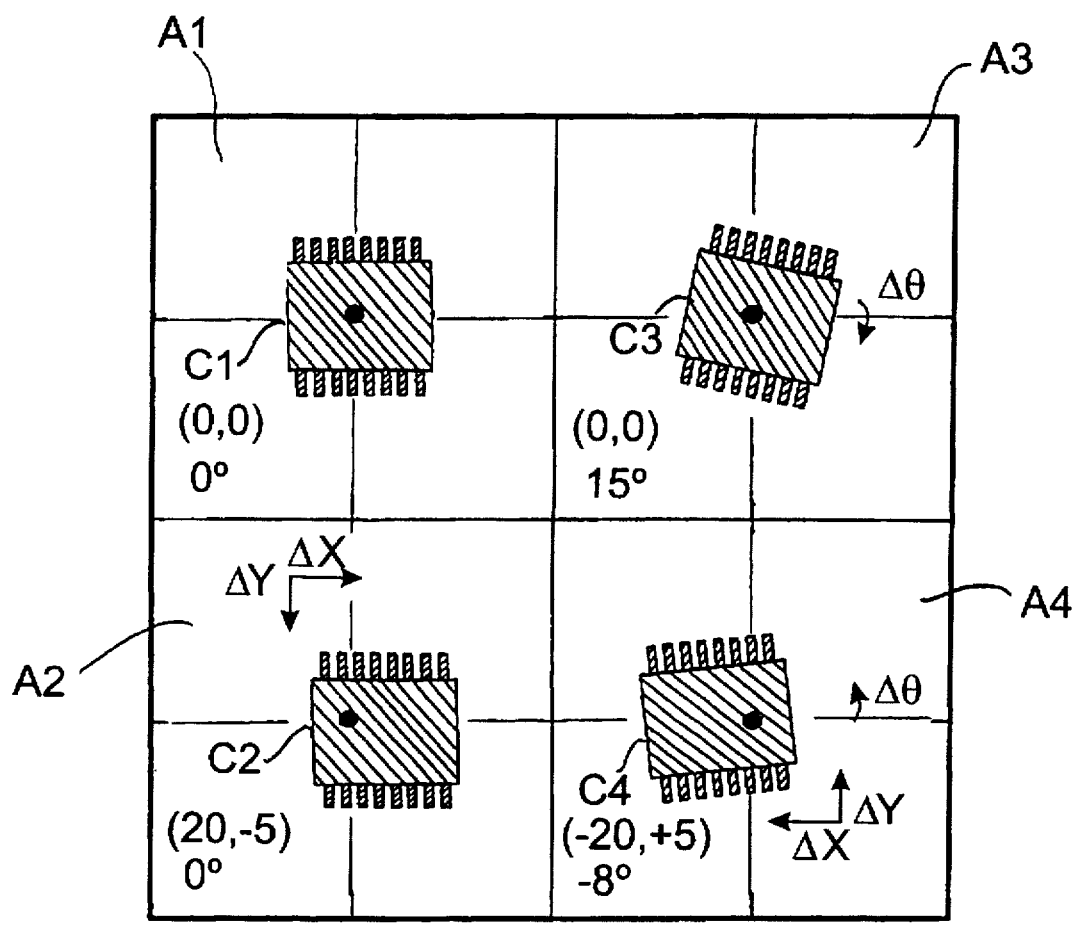
FIG. 5 illustrates how a single combined image representing multiple spindle images may appear on a computer display.

FIG. 5 shows how one image captured by camera 316 may appear on display 317 along with component location information. The image comprises areas A1 through A4, each including an image of a component on one spindle such as 302. Component C1, for example, is properly centered on its spindle, as indicated by the center of the component being aligned with the cross hairs in the upper left quadrant of the image and the information (0,0) and 0 degrees appearing in the lower left corner of this quadrant. Thus, no component location correction is necessary.

Component C2 in area A2, however, is offset by an amount Δx and Δy. Therefore, it must be translated a corresponding amount in the x and y direction to compensate. Component C3 in area A3 is properly centered, but is rotated about by an amount Δθ. Therefore, its orientation must be rotated by a corresponding amount. Finally, component C4 is both offset by an amount Δx and Δy and rotated by an amount Δθ. Therefore, its location must be both rotated and translated appropriately. As can be seen in FIG. 5, it may be desirable to indicate in each quadrant the component location translational and rotational errors identified for the component in that image quadrant.

Figure 6:
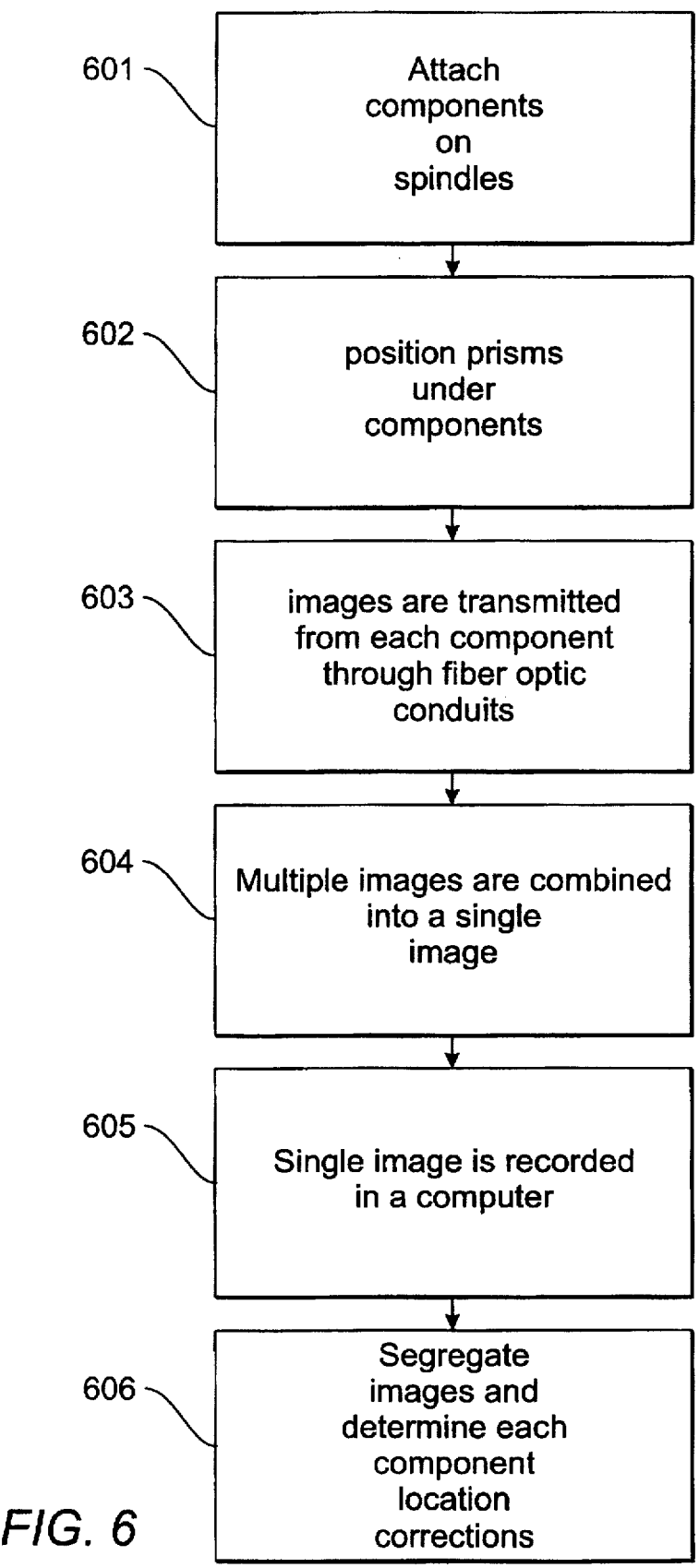
FIG. 6 shows various steps for carrying out a method in accordance with the invention.

FIG. 6 shows various steps which can be executed in order to practice certain aspects of the present invention. In step 601, components are picked up and attached to the spindles, using for example a vacuum attachment means. In step 602, a plurality of prisms are positioned under the components (equivalently, this may be accomplished by moving the components over a stationary set of prisms). In step 603, the image from each component is received through each prism and is transmitted by the corresponding fiber optic conduit; this step may include energizing a strobe light sequentially or simultaneously, or illuminating a light source to ensure sufficient reflection from each component. In step 604, multiple images are combined into a single image, such as by bundling multiple fiber optic conduits each transmitting an image from a corresponding component. In step 605, the combined image is recorded into a computer, preferably by way of a CCD camera which receives the combined image. In step 606, the combined images are again segregated into corresponding component images, and an appropriate component location correction amount for each component is determined. The correction amount is then used to control head 301 for each component placement. The software operating in image processing computer 318 may be used to perform steps 605 and 606 shown in FIG. 6.

It is apparent that many modifications and variations of the present invention are possible, and references to specific values are by example only. For example, the invention can be practiced for surface mounting as well as through-hole mounting of components. The phrase "component assembly device" and the like will be understood to include component placement devices, and other assembly operations requiring multiple component locating through-hole insertion devices. The method steps of the invention may be practiced in a different ordered sequence from that illustrated without departing from the scope of the invention. It is, therefore, to be understood that within the scope of the appended claims the invention may be practiced otherwise than as specifically described.

We claim:

1. Apparatus for determining component location information, comprising;

a head comprising a plurality of component spindles each capable of attaching a component;

a plurality of fiber optic conduits each having a first end disposed to receive a corresponding image from one of the attached components and a second end having a face for transmitting the corresponding image, wherein all of the second ends are bundled together to produce a single combined image of the corresponding individual images;

a camera positioned to capture the single combined image from the bundled fiber optic conduits;

image processing means, coupled to the camera, for storing the captured single combined image, segregating each component from the combined image, determining a location of each component therefrom, and establishing a location deviation of each component by comparing the determined location of each segregated component to a desired location for each component; and means for generating a location correction signal for each component based on the location deviation of each component.

2. The apparatus of claim 1, further comprising illumination means, encased around each of the plurality of fiber optic conduits, for illuminating each corresponding component.

3. The apparatus of claim 1, wherein the first end of each fiber optic conduit is disposed below one of the attached components in such a manner as to receive the corresponding image from the underside of the one attached component.

4. The apparatus of claim 1, further comprising prism means, movable from a first position away from the components to a second position under the components, for reflecting each corresponding image to a corresponding one of the fiber optic conduits.

5. The apparatus of claim 1, wherein each of the plurality of fiber optic conduits comprises a rectangular bundle of fibers a cross section thereof having an aspect ratio of approximately 4:3.

6. A method of controlling component location in a component assembly device, comprising the steps of:

(a) attaching a plurality of components on a corresponding plurality of component spindles;

(b) receiving a plurality of images each corresponding to one of the plurality of components;

(c) combining the plurality of images into a single combined image;

(d) capturing the single combined image in a camera;

(e) recording the image captured in step (d) in a computer; and (f) determining, based on the recorded image in the computer, location correction amounts for the plurality of components by separating each component from the recorded image, determining a location of each component therefrom, and establishing a location deviation of each component by comparing the determined location of each segregated component to a desired location for each component.

7. The method of claim 6, wherein step (b) comprises the step of moving a plurality of prisms under the plurality of components, each prism arranged to project an image from one of the plurality of components.

8. The method of claim 6, wherein step (b) comprises the step of moving the plurality of components over a plurality of fiber optic conduits each for capturing one of the images.

9. The method of claim 8, further comprising the step of illuminating the plurality of components using a plurality of light emitters each encased around a corresponding one of the plurality of fiber optic conduits.

10. A medium comprising a software program for performing step (f) of the method of claim 6.

11. The apparatus of claim 1, wherein the location correction signal comprises a translational correction and a rotational correction.

12. The apparatus of claim 1, wherein each of the fiber optic conduits comprises a plurality of fibers arranged in a rectangular bundle.

13. The apparatus of claim 1, further comprising a plurality of movable prisms each movable relative to one of the component spindles, wherein each prism when moved beneath one of the component spindles reflects an image of a corresponding component towards one of the first ends of the fiber optic conduits.

14. The apparatus of claim 1, wherein each of the plurality of fiber optic conduits comprises a plurality of glass fibers which accurately depict the shape and orientation of one of the attached components.

15. The method of claim 6, wherein step (f) comprises the step of determining a translational correction amount and a rotational correction amount.

16. The method of claim 15, further comprising the step of:

(g) using the translational correction amount and the rotational correction amount to adjust each of the plurality of component spindles.

17. Apparatus for placing components, comprising:

a plurality of component spindles each capable of attaching a component;

a plurality of fiber optic conduits each having a first end disposed to receive a corresponding image from one of the attached components and a second end having a face for transmitting the corresponding image, wherein all of the second ends are bundled together to produce a single combined image of the corresponding individual images, and wherein each of the fiber optic conduits comprises a plurality of glass optical fibers arranged in a rectangular bundle;

a plurality of movable reflectors arranged between the plurality of component spindles and the plurality of fiber optic conduits, the movable reflectors being movable between a first position away from the plurality of component spindles to a second position beneath the plurality of component spindles and towards the plurality of fiber conduits;

a plurality of lenses each arranged between a corresponding one of the plurality of movable reflectors and a corresponding one of the plurality of fiber conduits to direct light from the corresponding reflector to the corresponding fiber conduit;

a camera positioned to capture the single combined image from the bundled fiber optic conduits; and a computer, coupled to the camera, which receives the single combined image, segregates each component from the combined image, determines coordinates of each component in a component space, and generates location correction signals for each of the plurality of component spindles.

18. The apparatus of claim 17, further comprising an illumination source disposed around the periphery of each of the first ends which, when illuminated, causes light to be reflected off each component and into the first ends of the fiber conduits.

19. The apparatus of claim 17, further comprising a plurality of strobe lights which are fired in sequence to illuminate each of the plurality of components.

* * * * *